United States Patent
Xu et al.

(10) Patent No.: US 9,611,432 B2
(45) Date of Patent: Apr. 4, 2017

(54) CATALYTIC CRACKING CATALYST HAVING A HIGHER SELECTIVITY, PROCESSING METHOD AND USE THEREOF

(75) Inventors: Youhao Xu, Beijing (CN); Shouye Cui, Beijing (CN); Jun Long, Beijing (CN); Jianhong Gong, Beijing (CN); Zhijian Da, Beijing (CN); Jiushun Zhang, Beijing (CN); Yuxia Zhu, Beijing (CN); Yibin Luo, Beijing (CN); Jinlian Tang, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 1055 days.

(21) Appl. No.: 12/822,493

(22) Filed: Jun. 24, 2010

(65) Prior Publication Data
US 2010/0326888 A1    Dec. 30, 2010

(30) Foreign Application Priority Data

Jun. 25, 2009  (CN) .......................... 2009 1 0148614
Jun. 25, 2009  (CN) .......................... 2009 1 0148615
Apr. 22, 2010  (CN) .......................... 2010 1 0152745

(51) Int. Cl.
*C10G 11/18*    (2006.01)
*B01J 29/06*    (2006.01)
(Continued)

(52) U.S. Cl.
CPC .............. *C10G 11/05* (2013.01); *B01J 29/06* (2013.01); *B01J 29/084* (2013.01); *B01J 35/002* (2013.01);
(Continued)

(58) Field of Classification Search
None
See application file for complete search history.

(56) References Cited

U.S. PATENT DOCUMENTS 3,140,249 A    7/1964 Plank et al.
3,140,250 A    7/1964 Cramer et al.
(Continued)

FOREIGN PATENT DOCUMENTS

CN    86107598    6/1988
CN    86107531    8/1988
(Continued)

OTHER PUBLICATIONS

Combined Search Report and Examination Report dated Jun. 1, 2011 issued in corresponding Great Britain Application No. GB1010706.8.
(Continued)

*Primary Examiner* — Melvin C Mayes
*Assistant Examiner* — Colette Nguyen
(74) *Attorney, Agent, or Firm* — Novick, Kim & Lee, PLLC; Allen Xue

(57) ABSTRACT

The present invention provides a catalytic cracking catalyst, processing method and use thereof. When the catalyst is added into a commercial catalytic cracking unit, it has an initial activity of not higher than 80, preferably not higher than 75, more preferably not higher than 70, a self-balancing time of 0.1-50 h, and an equilibrium activity of 35-60. Said method enables the activity and selectivity of the catalyst in the catalytic cracking unit to be more homogeneous and notably improves the selectivity of the catalytic cracking catalyst, so as to obviously reduce the dry gas and coke yields, to sufficiently use steam and to reduce the energy consumption of the FCC unit.

26 Claims, 4 Drawing Sheets

(51) Int. Cl.
*C10G 11/05* (2006.01)
*B01J 29/08* (2006.01)
*B01J 35/00* (2006.01)
*B01J 37/04* (2006.01)
*B01J 37/10* (2006.01)

(52) U.S. Cl.
CPC .............. *B01J 37/04* (2013.01); *B01J 37/10* (2013.01); *B01J 2229/36* (2013.01); *B01J 2229/42* (2013.01)

(56) References Cited

U.S. PATENT DOCUMENTS

| | | | |
|---|---|---|---|
| 3,140,251 | A | 7/1964 | Plank et al. |
| 3,140,252 | A | 7/1964 | Frilette et al. |
| 3,140,253 | A | 7/1964 | Plank et al. |
| 3,402,996 | A | 9/1968 | Maher et al. |
| 3,702,886 | A * | 11/1972 | Argauer ................ 423/705 |
| 3,758,083 | A | 9/1973 | Palmer |
| 4,080,284 | A * | 3/1978 | Mitchell ............ B01J 37/082 208/111.15 |
| 4,242,237 | A | 12/1980 | Galdrow et al. |
| 4,259,212 | A * | 3/1981 | Gladrow ............. C10G 11/05 208/120.15 |
| 4,309,280 | A | 1/1982 | Rosinski et al. |
| 4,326,994 | A * | 4/1982 | Haag et al. .............. 502/77 |
| 4,374,019 | A * | 2/1983 | Hettinger, Jr. ........ C10G 11/18 208/113 |
| 4,812,223 | A * | 3/1989 | Hickey, Jr. .......... B01J 29/7415 208/111.15 |
| 4,880,787 | A | 11/1989 | Bundens et al. |
| 4,900,428 | A | 2/1990 | Mester et al. |
| 4,988,653 | A | 1/1991 | Herbst et al. |
| 4,994,173 | A | 2/1991 | Tai-Sheng et al. |
| 5,037,531 | A | 8/1991 | Bundens et al. |
| 5,171,921 | A | 12/1992 | Gaffney et al. |
| 5,324,416 | A | 6/1994 | Cormier et al. |
| 2001/0002426 | A1 | 5/2001 | Mohr et al. |
| 2004/0254060 | A1 | 12/2004 | Du et al. |
| 2008/0093263 | A1 | 4/2008 | Cheng et al. |
| 2009/0101543 | A1 | 4/2009 | Shen et al. |

FOREIGN PATENT DOCUMENTS

| | | |
|---|---|---|
| CN | 1053808 | 8/1991 |
| CN | 1098130 | 2/1995 |
| CN | 1210029 A | 3/1999 |
| CN | 2312065 Y | 3/1999 |
| CN | 1217231 | 5/1999 |
| CN | 2407174 Y | 11/2000 |
| CN | 1284403 | 2/2001 |
| CN | 1307087 | 8/2001 |
| CN | 1317547 | 10/2001 |
| CN | 1325940 | 12/2001 |
| CN | 1130981 | 1/2002 |
| CN | 1353086 | 6/2002 |
| CN | 1362472 | 8/2002 |
| CN | 1382528 A | 12/2002 |
| CN | 1417297 | 5/2003 |
| CN | 1436728 | 8/2003 |
| CN | 1449306 | 10/2003 |
| CN | 1602999 A | 4/2005 |
| CN | 1727442 | 2/2006 |
| CN | 1727445 | 2/2006 |
| CN | 101134172 A | 3/2008 |
| CN | 101386788 A | 3/2009 |
| CN | 101455979 | 6/2009 |
| CN | 101462071 A | 6/2009 |
| EP | 0350280 | 10/1990 |
| EP | 0550270 A1 | 7/1993 |
| EP | 1875963 A1 | 1/2008 |
| JP | 61204042 A2 | 9/1986 |
| JP | 8229405 A2 | 9/1996 |
| JP | 11510202 | 9/1999 |
| JP | 11300208 A2 | 11/1999 |
| WO | WO 95/09050 | 4/1995 |
| WO | WO 97/04871 A1 | 2/1997 |
| WO | 01/04785 A2 | 1/2001 |
| WO | 02087758 A1 | 11/2002 |
| WO | 2009/111953 A1 | 9/2009 |

OTHER PUBLICATIONS

Fluid Catalytic Cracking Handbook: Design, Operation, and Troubleshooting of FCC Facilities, Reza Sadeghbeigi, 2nd edition, p. 92, Figs.3-5.
Examination Report dated May 1, 2013, issued in corresponding Great Britain Application No. GB 1010706.8.
Fluid Catalytic Cracking Handbook, Second Edition, 2000, p. 92.
Wilson, et al., Fluid catalytic cracking technology and operations, PennWell Publishing Co., 1997; p. 276.
Standard Guide for Metals Free Steam Deactivation of Fresh Fluid Cracking Catalysts; ASTM Designation; 1996; D4463-96.
Coll, et al., Journal of Molecular Catalysis, vol. 6, Issue 4, Oct. 1979, pp. 235-249.
Corma A., Fornes V., Kolodziejski, et al., Orthophosphoric acid interactions with ultrastable zeolite Y: infrared and NMR studies, J. Catal., 1994, 145:27-36.
Vistad O.B., Hansen, E.W., Akpriaye D.E., et al., Multinuclear NMR Analysis of SAPO-34 Gels in the Presence and Absence of HF; The Initial Gel., J. Phys. Chem. A 1999, 103, 2540-2552.
Cuiding, Y et al., "Enterprise standard RIPP 92-90-Micro-reaction activity test method for catalytic cracking fresh catalysts" *Petrochemical analytic method (RIPP test method)* (1990), together with partial English translation.
Fluid Catalytic Cracking Handbook: Design, Operation, and Troubleshooting of FCC Facilities, Reza Sadeghbeigi, 2nd edition, p. 92, Figs.3-5, Dec. 1996.

* cited by examiner

CATALYTIC CRACKING CATALYST HAVING A HIGHER SELECTIVITY, PROCESSING METHOD AND USE THEREOF

FIELD OF THE INVENTION

The present invention relates to a catalyst in the catalytic cracking field, processing method and use thereof. Specifically, the present invention relates to a catalytic cracking catalyst having a higher selectivity, processing method and use thereof.

BACKGROUND OF THE INVENTION

In the early of 1960s, Y-type zeolites used at the soonest were the rare earth-exchanged REY zeolites. REY zeolites have a silica/alumina ratio of less than 5, a rare earth content of not less than 17 wt % (based on $RE_2O_3$, and relative to the weight of the zeolites), a high acid center density, and a strong hydrogen transfer performance, a low olefin and naphthene content in gasoline, so as to reduce the octane number of gasoline. Thus tetraethyl lead was obliged to being added as an additive for increasing the octane number thereof. Nevertheless, Y-type zeolite is still the main active component in the catalyst for FCC (Fluid Catalytic Cracking) of heavy petroleum hydrocarbons.

In 1975, U.S.A abrogated leaded gasoline, and the cracking catalysts in which ultrastable Y (USY) zeolites replace REY zeolites as the active component appeared. USY is a high silica Y zeolite prepared by framework dealuminization of Y-type zeolites via hydrothermal treatment, wherein said zeolite generally has a silica/alumina ratio of from 5 to 10 and contains no or a small quantity of rare earth. Since USY has an increased framework silica/alumina ratio, a reduced acid center density, and a weakened hydrogen transfer performance, gasoline has an increased olefin content and an enhanced octane number. For example, U.S. Pat. No. 4,242,237 discloses a cracking catalyst for producing gasoline having a high octane number, wherein the active components comprise a USY zeolite having a rare earth in an amount of less than 1.15 wt % (based on $RE_2O_3$, and relative to the weight of zeolites) and small pore zeolites including erionite, mordenite, A zeolite, chabazite and offretite. U.S. Pat. No. 4,259,212 discloses a cracking catalyst containing USY zeolites which comprise rare earth in an amount of less than 1.15 wt % (based on $RE_2O_3$, and relative to the weight of zeolites) and a unit cell constant less than 24.41 Å. USY zeolites used in said two patent documents both comprise a small quantity of rare earth. In the early 80s, ZSM-5 type zeolites began to be used in FCC catalysts for increasing the octane number of gasoline. U.S. Pat. No. 4,309,280 discloses that 0.01-1 wt % of HZSM-5 zeolites relative to the weight of the catalyst may be directly added into the FCC apparatus. U.S. Pat. No. 3,758,083 discloses a catalyst containing as active components ZSM-5 zeolites and large pore zeolites (such as X-type and Y-type) in a ratio of 1:30 to 3:1, which is used to increase the octane number of the gasoline product and enhance the $C_3^=+C_4^=$ yield at the same time. The function of ZSM-5 during FCC is actually to crack straight chain hydrocarbons having a low octane number in the gasoline fraction into low carbon olefins, to aromatize a part of low carbon olefins, so as to increase the octane number of gasoline. Thus the application of ZSM-5 will unavoidably increase the olefin and aromatic hydrocarbon content in the gasoline. There are lots of patent documents regarding high silica Y zeolites as the activity component of the catalyst. For example, U.S. Pat. No. 4,880,787 discloses a zeolite catalyst containing USY having a silica/alumina of 5-100 and a constraint index of 1-12, wherein the support comprises aluminium and 0.01-10 wt % of rare earth elements relative to the weight of the catalyst. Such catalyst is primarily used for increasing FCC gasoline and distillate oil yields and reducing coke and dry gas yields during the FCC process.

The catalyst prepared from REY zeolites or USY zeolites having a broad silica/alumina ratio cannot magnificently meet the requirements on the selectivity of the FCC target product. When added into the commercial catalytic cracking unit, said REY-type zeolite catalyst or USY-type zeolite catalyst has an initial activity of higher than 85, wherein REY-type zeolite catalyst has an initial activity of higher than 90. Under the high strength hydrothermal treatment, the catalyst activity of said two kinds of zeolite catalysts gradually decreases. The catalyst activity of REY-type zeolite catalyst decreases straightly, while the initial activity of USY-type zeolite catalyst at first decreases quickly, and then slowly as the aging time increases (see Fluid Catalytic Cracking Handbook: Design, Operation, and Troubleshooting of FCC Facilities, Reza Sadeghbeigi, 2nd edition, P 92, FIGS. 3-5).

Along with the increase of the crude oil output, the quality of crude oil becomes worse mainly in the following aspects: crude oil density becomes greater; the viscosity thereof increases; the heavy metal content, the sulfur content, the nitrogen content, the resin and asphaltene content, and the acid number becomes higher. Currently, price difference between inferior crude oil and high-quality crude oil becomes great along with the shortage of petroleum resources. Thus much attention is paid to the method for exploiting and processing inferior crude oils having a low cost, i.e. increasing the yield of light oils from inferior crude oils as much as possible, which brings about great challenge to the conventional processing technology for crude oil. In order to meet the increasing need for light olefin chemicals and motor gasoline, PCT/CN2009/000272 discloses a process for producing light fuel oil and propylene from inferior feedstocks. Inferior feedstocks are fed into the first and second reaction zone of the catalytic converting reactor in turn, are in contact with the catalytic converting catalyst to carry out the first and second reactions. After the gas-solid separation of the reaction product and the spent catalyst, the spent catalyst is stripped, coke-burned and then recycled into the reactor. After the separation of the reaction product, propylene, gasoline, fluid catalytic cracking gas oil (FGO) and other products are obtained, wherein said fluid catalytic cracking gas oil is fed into the aromatic extraction unit to obtain the extracted oil and raffinate oil by separation. Said raffinate oil is recycled to the first reaction zone of the catalytic converting reactor or/and other catalytic converting devices for further reaction to obtain the target products, i.e. propylene and gasoline. In said process, FGO obtained after moderate catalytic conversion of inferior feedstocks is separated by using an aromatic extraction unit. Bicyclic aromatic hydrocarbons are enriched in the extracted oil, so that the extracted oil is an excellent chemical. Alkanes and cyclanes are enriched in the raffinate oil, so that raffinate oil is very suitable for catalytic conversion, so as to achieve the high efficient utilization of petroleum resources. Said process can greatly reduce the dry gas and coke yield, and the catalyst used in said process is mainly based on the selectivity of the catalyst for the target product.

Due to continuous abrasion, the catalyst in the commercial catalytic cracking unit drains away during the operation. In addition, a part of the equilibrium catalyst is usually unloaded in order to maintain the equilibrium catalyst activity as required by the reaction. Meanwhile, it is forced to supplement fresh catalyst (currently, the activity of a generally fresh catalyst is higher than 85, and the selectivity of the dry gas and coke is extremely worse). Thus there is the reasonable makeup rate of fresh catalyst to the inventory of the system equilibrium catalyst. It can be seen that the equilibrium catalyst is the result of the combined effect of the continuous addition of fresh catalyst and the continuous loss (including artificial unloading) of the system equilibrium catalyst. Currently, fresh catalyst is usually supplemented into the catalytic cracking unit by the following method. That is to say, fresh catalyst from the fresh catalyst storage tank is fed into the hand feeding instrument or automatic feeding instrument, weighted, and discharged after air-venting and fluidization, and then the catalyst is delivered to the regenerator of the catalytic cracking unit. As for how to achieve the autoweighting of the catalyst, and how to reduce the equipment failure during the automatic feeding process, there are many patents documents. For example, CN1210029A discloses a small-size automatic feeding system for the catalytic cracking catalyst.

Hydrothermal inactivation of a catalyst is a slow process having an average lifetime of 30-100 days. During the inactivation process, the activity of the fresh catalyst, the metal content of the feedstock oil and other properties thereof, the operating conditions of the FCCU (Fluid Catalytic Cracking Unit), the wastage and dump rate of the catalyst cannot remain constant. Meanwhile, fresh catalyst in the single particle form loses the physical and chemical properties thereof at the moment of the entry into the complete-mixing-flowing regenerator. Due to these problems, it is difficult to accurately predict the age distribution and activity distribution of the catalyst in the commercial catalytic cracking unit. By directly taking the equilibrium catalyst sample in the commercial catalytic cracking unit for measuring the activity of the equilibrium catalyst or other properties, or calculating the activity or other properties of the equilibrium catalyst on the basis of the simplified mathematical model, the resultant activity or other properties of the equilibrium catalyst are merely the average values of the average activity or other properties. These values are the key parameters for instructing the production operation of the FCCU and optimizing the product distribution and property. However, there occurs a serious problem at the same time, i.e. overlooking the difference in the effects of each and every catalyst particle in the commercial catalytic cracking unit on the product distribution and property. CN1382528A discloses a cyclic polluting and aging process for catalyst. After treatment by said process, the physicochemical properties of a fresh catalyst all are close to the industrial equilibrium catalyst. Said process is mainly designed for the difference between the catalyst processed in laboratories and the industrial equilibrium catalyst, but it is unable to improve the activity difference between the industrial equilibrium catalysts. CN1602999A discloses a method of exterior pre-treatment for hydrogenation catalysts, comprising the steps of ex-situ prevulcanization of gas phase of hydrogenation catalyst in oxidation state, passivating the catalyst in sulfidization state by using the oxygen containing passivation gas. Said method can notably increase the activity and stability of the catalyst. However, said method is merely suitable for the treatment of hydrogenation catalyst, rather than the catalytic cracking catalyst.

SUMMARY OF THE INVENTION

The object of the present invention is to provide a catalytic cracking catalyst having a higher selectivity on the basis of the prior art, processing method and use thereof.

The inventors find that all single particle catalysts have different cracking activities and selectivities due to different residence time in the commercial catalyst cracking unit. The inventors' studies show that most catalysts in the commercial catalytic cracking unit have a longer age and less contribution to the activity. After the unit is operated for 100 days, about half of the catalysts added therein still retain in the system, but have only 5% contributions to the activity. The catalysts having a service life of only 25 days are in an amount of only ⅙ of the total amount in the system, but have ⅔ contributions to the activity of the whole system. The activity of the catalyst in the commercial catalytic cracking unit is almost close to the function of the regeneration temperature and steam partial pressure. Steam enables the aging process of the catalyst to have a "self-balancing" process, i.e. the aging effect thereof attenuates along with the prolongation of the aging time. Meanwhile, study results show that, when the catalysts are converted from fresh catalyst (higher micro-reaction activity) to balanced catalysts (lower micro-reaction activity), the selectivity of the dry gas and coke are rapidly improved until the balance is reached. Thus the best way to improve the catalytic cracking selectivity is to add the catalysts having a higher selectivity into the commercial catalytic cracking unit, rather than to add fresh catalysts having a higher micro-reaction activity directly into the commercial catalytic cracking unit.

In the first aspect, the present invention provides a catalytic cracking catalyst having a higher selectivity, characterized in that, when added into an commercial catalytic cracking unit, the catalyst has an initial activity of not higher than 80, preferably not higher than 75, more preferably not higher than 70, a self-balancing time ranging from 0.1 to 50 h, preferably from 0.2 to 30 h, more preferably from 0.5 to 10 h, and an equilibrium activity ranging from 35 to 60, preferably from 40 to 55.

The initial activity of the catalyst or the fresh catalyst activity as mentioned below means the catalyst activity evaluated by the light oil micro-reaction apparatus. It can be measured by the measuring method in the prior art: Enterprise standard RIPP 92-90-Micro-reaction activity test method for catalytic cracking fresh catalysts, *Petrochemical analytic method* (*RIPP test method*), Yang Cuiding et al, 1990 (hereinafter referred to as RIPP 92-90). The initial activity of the catalyst or the fresh catalyst activity is represented with light oil micro-reaction activity (MA), calculated by the equation:

MA=(output of the gasoline having a temperature less than 204° C. in the product+gas output+ coke output)/total weight of the feedstock*100%=the yield of the gasoline having a temperature less than 204° C. in the product+gas yield+coke yield.

The evaluation conditions of the light oil micro-reaction apparatus (referring to RIPP 92-90) include pulverizing the catalyst into particles having a particle diameter of 420-481 μm; 5 g catalyst being loaded into the apparatus; the reaction materials being straightrun light diesel fuel having a distillation range of 235-337° C.; the reaction temperature being 460° C.; the weight hourly space velocity being 16 h$^{-1}$; and the Catalyst/feedstock ratio being 3.2.

The self-balancing time of the catalyst is the time necessary for achieving the equilibrium activity by aging at 800° C. and 100% steam (by reference to RIPP 92-90).

The catalyst is obtainable by the methods in the following second, third or fourth aspect.

The catalyst comprises, relative to the total weight of the catalyst, 1-50% by weight of a zeolite, 5-99% by weight of an inorganic oxide and 0-70% by weight of an optional clay, wherein the zeolite as the active component is selected from medium pore zeolites and/or large pore zeolites. Relative to the total weight of zeolites, medium pore zeolites are in an amount of 0-100% by weight, and large pore zeolites are in an amount of 0-100% by weight. Medium pore zeolites are selected from the group consisting of ZSM series of zeolites and/or ZRP zeolites. In addition, said medium pores zeolites can be modified with non-metal elements such as phosphor and the like and/or transitional metal elements such as iron, cobalt, nickel and the like. The detailed descriptions relevant to ZRP can be found in U.S. Pat. No. 5,232,675. ZSM series of zeolites are selected from one or more of ZSM-5, ZSM-11, ZSM-12, ZSM-23, ZSM-35, ZSM-38, ZSM-48 and other zeolites having similar structures, and the detailed descriptions relevant to ZSM-5 can be found in U.S. Pat. No. 3,702,886. Large pore zeolites are selected from one or more of rare earth Y (REY), rare earth hydrogen Y (REHY), ultra-stable Y obtained by various methods, and high-silica Y.

The inorganic oxide as the binder is selected from the group consisting of $SiO_2$, and/or $Al_2O_3$.

The clay as the substrate (i.e. support) is selected from the group consisting of kaolin and/or halloysite.

In the second aspect, the present invention provides a processing method for improving the selectivity of the catalytic cracking catalyst, said method comprising the steps of
(1) feeding a fresh catalyst into a fluidized bed, preferably a dense phase fluidized bed, contacting with steam, aging under a certain hydrothermal circumstance to obtain an aged catalyst; and
(2) feeding the aged catalyst into a commercial catalytic cracking unit.

The technical solution of the present invention is specifically carried out, for example, as follows.

A fresh catalyst is fed into a fluidized bed, preferably a dense phase fluidized bed, and steam is fed into the bottom of the fluidized bed. The fluidization of the catalyst is achieved under the action of steam, and the catalyst is aged by steam at the same time to obtain the aged catalyst as stated in the first aspect. The aging temperature ranges from 400° C. to 850° C., preferably from 500° C. to 750° C., more preferably from 600° C. to 700° C. The superficial linear velocity of the fluidized bed ranges from 0.1 to 0.6 m/s, preferably from 0.15 to 0.5 m/s. The aging time ranges from 1 to 720 h, preferably from 5 to 360 h. According to the requirements on commercial catalytic cracking unit, the aged catalyst is added into the commercial catalytic cracking unit, preferably into the regenerator of the commercial catalytic cracking unit.

It should be indicated that, in the present application, the regenerator is deemed as one part of the commercial catalytic cracking unit.

The catalyst comprises, relative to the total weight of the catalyst, 1-50% by weight of a zeolite, 5-99% by weight of an inorganic oxide and 0-70% by weight of an optional clay, wherein the zeolite as the active component is selected from medium pore zeolites and/or large pore zeolites. Relative to the total weight of zeolites, medium pore zeolites are in an amount of 0-100% by weight, and large pore zeolites are in an amount of 0-100% by weight. Medium pore zeolites are selected from the group consisting of ZSM series of zeolites and/or ZRP zeolites. In addition, said medium pores zeolites can be modified with non-metal elements such as phosphor and the like and/or transitional metal elements such as iron, cobalt, nickel and the like. The detailed descriptions relevant to ZRP can be found in U.S. Pat. No. 5,232,675. ZSM series of zeolites are selected from one or more of ZSM-5, ZSM-11, ZSM-12, ZSM-23, ZSM-35, ZSM-38, ZSM-48 and other zeolites having similar structures, and the detailed descriptions relevant to ZSM-5 can be found in U.S. Pat. No. 3,702,886. Large pore zeolites are selected from one or more of rare earth Y (REY), rare earth hydrogen Y (REHY), ultra-stable Y obtained by various methods, and high-silica Y.

The inorganic oxide as the binder is selected from the group consisting of $SiO_2$ and/or $Al_2O_3$.

The clay as the substrate (i.e. support) is selected from the group consisting of kaolin and/or halloysite.

Steam after the aging step is used as one or more selected from the group consisting of stripping steam, dome steam, atomizing steam and lifting steam, and respectively added into the stripper, disengager, raw material nozzle and/or prelifting zone of the catalytic cracking unit. Steam can also be useful as, e.g. loosing steam, etc.

In the third aspect, the present invention provides another processing method for improving the selectivity of the catalytic cracking catalyst, said method comprising the steps of
(1) feeding a fresh catalyst into a fluidized bed, preferably a dense phase fluidized bed, contacting with an aging medium containing steam, aging under a certain hydrothermal circumstance to obtain an aged catalyst; and
(2) feeding the aged catalyst into a commercial catalytic cracking unit.

The technical solution of the present invention is specifically carried out, for example, as follows.

A fresh catalyst is fed into a fluidized bed, preferably a dense phase fluidized bed, and an aging medium containing steam is fed into the bottom of the fluidized bed. The fluidization of the catalyst is achieved under the action of the aging medium containing steam, and the catalyst is aged by the aging medium containing steam at the same time to obtain the aged catalyst as stated in the first aspect. The aging temperature ranges from 400° C. to 850° C., preferably from 500° C. to 750° C., more preferably from 600° C. to 700° C. The superficial linear velocity of the fluidized bed ranges from 0.1 to 0.6 m/s, preferably from 0.15 to 0.5 m/s. The weight ratio of steam to the aging medium ranges from 0.20 to 0.9, preferably from 0.40 to 0.60. The aging time ranges from 1 to 720 h, preferably from 5 to 360 h. According to the requirements on commercial catalytic cracking unit, the aged catalyst is added into the commercial catalytic cracking unit, preferably into the regenerator of the commercial catalytic cracking unit.

The catalyst comprises, relative to the total weight of the catalyst, 1-50% by weight of a zeolite, 5-99% by weight of an inorganic oxide and 0-70% by weight of an optional clay, wherein the zeolite as the active component is selected from medium pore zeolites and/or large pore zeolites. Relative to the total weight of zeolites, medium pore zeolites are in an amount of 0-100% by weight, and large pore zeolites are in an amount of 0-100% by weight. Medium pore zeolites are selected from the group consisting of ZSM series of zeolites and/or ZRP zeolites. In addition, said medium pores zeolites can be modified with non-metal elements such as phosphor and the like and/or transitional metal elements such as iron, cobalt, nickel and the like. The detailed descriptions relevant to ZRP can be found in U.S. Pat. No. 5,232,675. ZSM series of zeolites are selected from one or more of ZSM-5, ZSM-11, ZSM-12, ZSM-23, ZSM-35, ZSM-38, ZSM-48 and other zeolites having similar structures, and the detailed descriptions relevant to ZSM-5 can be found in U.S. Pat. No.

3,702,886. Large pore zeolites are selected from one or more of rare earth Y (REY), rare earth hydrogen Y (REHY), ultra-stable Y obtained by various methods, and high-silica Y.

The inorganic oxide as the binder is selected from the group consisting of $SiO_2$ and/or $Al_2O_3$.

The clay as the substrate (i.e. support) is selected from the group consisting of kaolin and/or halloysite.

The aging medium comprises air, dry gas, regenerated flue gas, gas obtained by combusting air and dry gas or gas obtained by combusting air and burning oil, or other gases such as nitrogen gas. The weight ratio of steam and aging medium ranges from 0.2 to 0.9, preferably from 0.40-0.60. The regenerated flue gas may be derived from the present unit, or from other units. The aging medium containing steam after the aging step is fed into the regenerator.

In the fourth aspect, the present invention provides another processing method for improving the selectivity of the catalytic cracking catalyst, said method comprising the steps of
(1) feeding a fresh catalyst into a fluidized bed, preferably a dense phase fluidized bed, feeding a hot regenerated catalyst in a regenerator into the fluidized bed, and heat exchanging the fresh catalyst and the hot regenerated catalyst in the fluidized bed;
(2) contacting the heat exchanged fresh catalyst with steam or an aging medium containing steam, aging under a certain hydrothermal circumstance to obtain an aged catalyst; and
(3) feeding the aged catalyst into a commercial catalytic cracking unit.

The technical solution of the present invention is specifically carried out, for example, as follows.

A fresh catalyst is fed into a fluidized bed, preferably a dense phase fluidized bed, and the hot regenerated catalyst in the regenerator is introduced into the fluidized bed at the same time to carry out a heat exchange between these two catalysts in the fluidized bed. Steam or an aging medium containing steam is fed into the bottom of the fluidized bed. The fluidization of the fresh catalyst is achieved under the action of steam or the aging medium containing steam, and the fresh catalyst is aged by steam or the aging medium containing steam at the same time to obtain the aged catalyst as stated in the first aspect. The aging temperature ranges from 400° C. to 850° C., preferably from 500° C. to 750° C., more preferably from 600° C. to 700° C. The superficial linear velocity of the fluidized bed ranges from 0.1 to 0.6 m/s, preferably from 0.15 to 0.5 m/s. The aging time ranges from 1 to 720 h, preferably from 5 to 360 h. Under the circumstance of the aging medium containing steam, the weight ratio of steam to the aging medium is greater than 0-4, preferably ranges from 0.5 to 1.5. According to the requirements on commercial catalytic cracking unit, the aged catalyst is added into the commercial catalytic cracking unit, preferably into the regenerator of the commercial catalytic cracking unit. In addition, steam after the aging step is fed into a reaction system (as one or more selected from the group consisting of stripping steam, dome steam, atomizing steam and lifting steam, and respectively added into the stripper, disengager, raw material nozzle and prelifting zone of the catalytic cracking unit) or a regeneration system. The aging medium containing steam after the aging step is fed into a regeneration system, and the heat exchanged regenerated catalyst is recycled back to the regenerator.

The catalyst comprises, relative to the total weight of the catalyst, 1-50% by weight of a zeolite, 5-99% by weight of an inorganic oxide and 0-70% by weight of an optional clay, wherein the zeolite as the active component is selected from medium pore zeolites and/or large pore zeolites. Relative to the total weight of zeolites, medium pore zeolites are in an amount of 0-100% by weight, and large pore zeolites are in an amount of 0-100% by weight. Medium pore zeolites are selected from the group consisting of ZSM series of zeolites and/or ZRP zeolites. In addition, said medium pores zeolites can be modified with non-metal elements such as phosphor and the like and/or transitional metal elements such as iron, cobalt, nickel and the like. The detailed descriptions relevant to ZRP can be found in U.S. Pat. No. 5,232,675. ZSM series of zeolites are selected from one or more of ZSM-5, ZSM-11, ZSM-12, ZSM-23, ZSM-35, ZSM-38, ZSM-48 and other zeolites having similar structures, and the detailed descriptions relevant to ZSM-5 can be found in U.S. Pat. No. 3,702,886. Large pore zeolites are selected from one or more of rare earth Y (REY), rare earth hydrogen Y (REHY), ultra-stable Y obtained by various methods, and high-silica Y.

The inorganic oxide as the binder is selected from the group consisting of $SiO_2$ and/or $Al_2O_3$.

The clay as the substrate (i.e. support) is selected from the group consisting of kaolin and/or halloysite.

The aging medium comprises air, dry gas, regenerated flue gas, gas obtained by combusting air and dry gas or gas obtained by combusting air and burning oil, or other gases such as nitrogen gas. The regenerated flue gas may be derived from this apparatus, or from other apparatus.

In the fifth aspect, the present invention provides the use of the catalyst according to the first aspect or the catalyst obtainable according to the methods in the second, third, or fourth aspect in the catalytic cracking process, wherein the catalyst is added into the commercial catalytic cracking unit (preferably the regenerator) for the catalytic cracking process. Those skilled in the art will obviously be aware that various features in the first, second, third or fourth aspect above are also suitable for said fifth aspect.

In the sixth aspect, the present invention provides the method for preparing the catalyst according to the first aspect, wherein the aforesaid fresh catalyst is aged according to the method as stated in the second, third, or fourth aspect, and then added into the commercial catalytic cracking unit (preferably the regenerator) for the catalytic cracking process. For example, the aging treatment is any of the following methods 1, 2 and 3:

Method 1: A fresh catalyst is fed into the fluidized bed, contacted with steam, aged under a certain hydrothermal circumstance to obtain an aged catalyst (the descriptions in the second aspect above can also be referred to);

Method 2: A fresh catalyst is fed into the fluidized bed, contacted with an aging medium containing steam, aged under a certain hydrothermal circumstance to obtain an aged catalyst (the descriptions in the third aspect above can also be referred to);

Method 3: A fresh catalyst is fed into the fluidized bed, and a hot regenerated catalyst in the regenerator is introduced into the fluidized bed at the same time to heat exchange the both catalysts in the fluidized bed. The heat exchanged fresh catalyst is then contacted with steam or an aging medium containing steam, and aged under a certain hydrothermal circumstance to obtain an aged catalyst (the descriptions in the fourth aspect above can also be referred to).

Those skilled in the art will obviously be aware that the preferred or further features in Method 1, 2 or 3 above respectively correspond to the features in the second, third or fourth aspects.

The present invention has the following technical effects as compared with the prior art:
1. The activity and selectivity distribution of the catalyst in the catalytic cracking unit are more homogeneous.
2. The selectivity of the catalytic cracking catalyst is notably improved so as to obviously decrease the dry gas and coke yields.
3. The self-resources of the catalytic cracking unit are sufficiently utilized so as to reduce the cost required for aging the catalyst.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

As used herein, the terms "comprising" and "including" means that other steps and ingredients that do not affect the final result can be added. The terms encompass the terms "consisting of" and "consisting essentially of".

The term "method" or "process" refers to manners, means, techniques and procedures for accomplishing a given task including, but not limited to, those manners, means, techniques and procedures either known to, or readily developed from known manners, means, techniques and procedures by practitioners of the chemical and chemical engineering.

Throughout this disclosure, various aspects of this invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "between" a first indicate number and a second indicate number and "ranging/ranges from" a first indicate number "to" a second indicate number are used herein interchangeably and are meant to include the first and second indicated numbers and all the fractional and integral numerals therebetween.

BRIEF DESCRIPTION OF THE DRAWINGS

The present invention is herein described, by way of example only, with reference to the accompanying drawings. With specific reference now to the drawings in detail, it is stressed that the particulars shown are by way of example and for purposes of illustrative description of the preferred embodiments of the present invention only, and are presented in the cause of providing what is believed to be the most useful and readily understood description of the principles and conceptual aspects of the present invention. In this regard, no attempt is made to show structural details of the present invention in more detail than is necessary for a fundamental understanding of the invention, the description taken with the drawings making apparent to those skilled in the art how the several forms of the invention may be embodied in practice.

DETAILED DESCRIPTION OF THE EMBODIMENTS

The drawings are intended to be illustrative, not limitative, for the method provided in the present invention.

Figure 1:
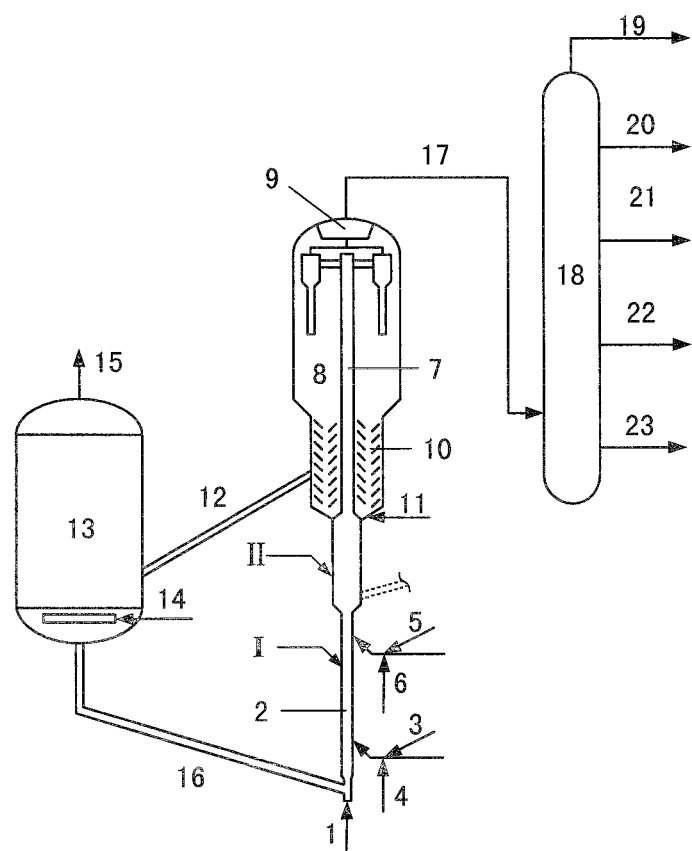
FIG. 1 is the basis schematic representation of the catalytic conversion method relevant to the present invention.

FIG. 1 is the basic schematic representation of the catalytic conversion method relevant to the present invention.

The pre-lifted medium is fed from the bottom of the riser reactor 2 via pipe line 1. The regenerated catalyst from pipe line 16 is moved upward along with the riser under the lifting action of the pre-lifted medium. A part of the feedstock oil via pipe line 3 and the atomized steam from pipe line 4 are fed into the bottom of the reaction zone I of the riser 2, and mixed with the existing stream in the riser reactor. The feedstock oil is cracked on the hot catalyst and makes the accelerated upward motion. A part of the feedstock oil via pipe line 5 and the atomized steam from pipe line 6 are fed into the middle and upper parts of the reaction zone I of the riser 2, and mixed with the existing stream in the riser reactor. The feedstock oil is cracked on the catalyst containing a little deposited coke thereon and makes the accelerated upward motion into the reaction zone II for continuous reaction. The produced reaction product-oil gas and the deactivated spent catalyst are fed into the cyclone separator in the disengager 8 via pipe line 7, so as to separate the spent catalyst from the reaction product-oil gas. The reaction product-oil gas is fed into the collection chamber 9, and the fine catalyst powder is recycled to the diengager via the dipleg. The spent catalyst in the disengager flows to the stripping zone 10, and is in contact with steam from pipe line 11. The reaction product-oil gas stripped from the spent catalyst is fed into the collection chamber 9 via the cyclone separator. The stripped spent catalyst is fed into the regenerator 13 via the sloped tube 12, and the main air enters the regenerator via pipe line 14. Coke on the spent catalyst is burned off to regenerate the deactivated spent catalyst, and the flue gas enters the turbine via pipeline 15. The regenerated catalyst is fed into the riser via the sloped tube 16.

The reaction product-oil gas in the collector chamber 9 is fed into the subsequent separation system 18 via the main oil gas pipe line 17. The separated dry gas is drawn out via pipeline 19. The liquefied petroleum gas (LPG) obtained by separation is drawn out via pipe line 20; the gasoline obtained by separation is drawn out via pipe line 21; the diesel oil obtained by separation is drawn out via pipe line 22; and the fluid catalytic cracking gas oil obtained by separation is drawn out via pipe line 23. The distillation range of each fraction can be adjusted according to the actual requirements of the refinery.

Figure 2:
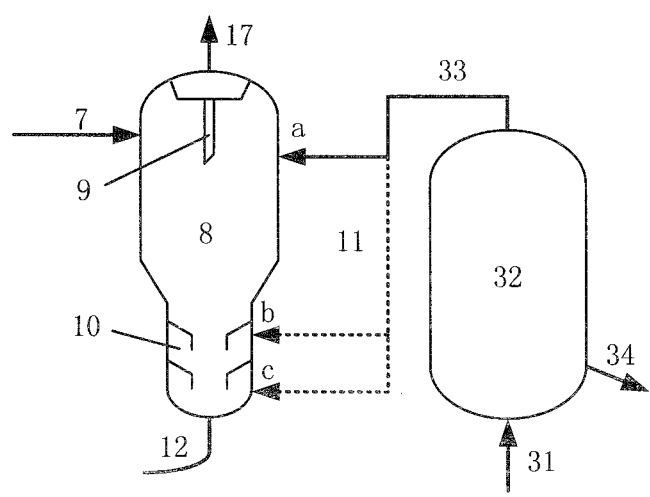
FIG. 2 is the schematic representation of the processing method for improving the selectivity of the catalytic cracking catalyst according to the present invention.

FIG. 2 is the schematic representation of the processing method for improving the selectivity of the catalytic cracking catalyst according to the present invention. However, the fresh catalyst ager is not restricted to being placed adjacent to the disengager, and the aged catalyst is not restricted to being recycled to the regenerator.

A fresh catalyst ager, i.e. a dense phase fluidized bed 32, may be placed adjacent to the disengager so as to feed the fresh catalytic cracking catalyst into the dense phase fluidized bed 32. Steam is fed into the dense phase fluidized bed 32 via pipeline 31 so as to age the fresh catalyst in the dense phase fluidized bed 32. The aged steam is recycled from the influx inlet a to the disengager 8 via pipe line 33 and used as dome steam or purge steam or linked with pipeline 11, injected into the stripper from influx inlets b and c and used as the stripping steam. According to the requirements on the commercial catalytic cracking unit, the aged catalyst is added into the regenerator 13 of the commercial catalytic cracking unit via pipeline 34.

Figure 3:
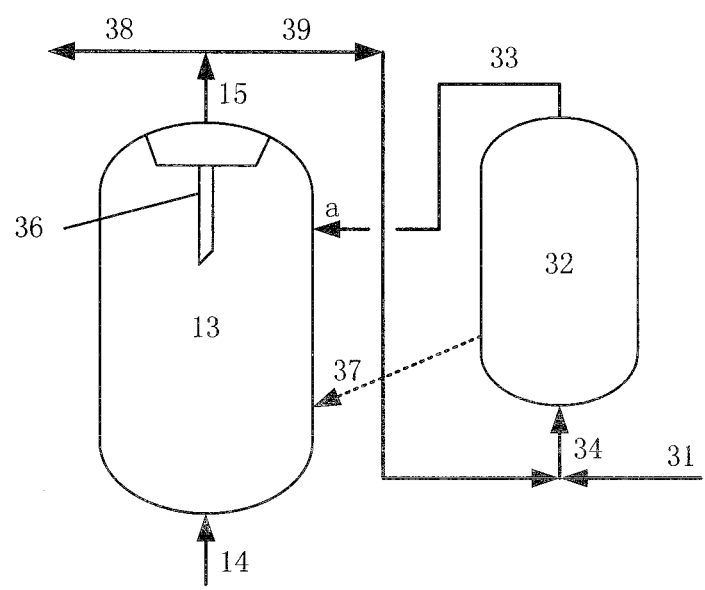
FIG. 3 is another schematic representation of the processing method for improving the selectivity of the catalytic cracking catalyst according to the present invention.

FIG. 3 is another schematic representation of the processing method for improving the selectivity of the catalytic cracking catalyst according to the present invention. However, the fresh catalyst ager is not restricted to being placed adjacent to the regenerator, and the aged catalyst is not restricted to being recycled to the regenerator.

A fresh catalyst ager, i.e. a dense phase fluidized bed 32, may be placed adjacent to the regenerator 13 so as to feed the fresh catalytic cracking catalyst into the dense phase fluidized bed 32. Steam is mixed with the flue gas from pipe line 39 in the pipe line 34, and the mixed gas is fed into the bottom of the dense phase fluidized bed 32 to age the fresh catalyst in the dense phase fluidized bed 32. The aged gas (steam+flue gas) is recycled from the influx inlet a to the regenerator 13 via pipe line 33. The flue gas is fed into the cyclone separator 36 for gas-solid separation. The separated flue gas departs from the regenerator via pipe line 15, and then is divided into two streams, wherein one stream enters the turbine via pipe line 38, and the other stream is mixed with steam from pipe line 31 via pipe line 39. According to the requirements on the commercial catalytic cracking unit, the aged catalyst is added into the regenerator 13 of the commercial catalytic cracking unit via pipeline 37, and the prevailing wind is fed into the regenerator 13 via pipe line 14 for regeneration of the catalyst.

Figure 4:
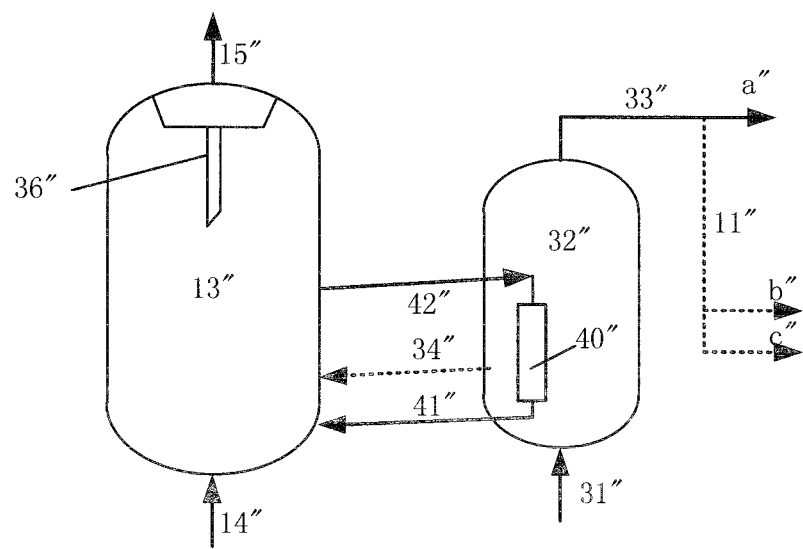
FIG. 4 is still another schematic representation of the processing method for improving the selectivity of the catalytic cracking catalyst according to the present invention.

FIG. 4 is another schematic representation of the processing method for improving the selectivity of the catalytic cracking catalyst according to the present invention. However, the fresh catalyst ager is not restricted to being placed adjacent to the regenerator, and the aged catalyst is not restricted to being recycled to the regenerator. Moreover, the model and manner of the heat exchanger are not restricted to those as shown in the drawings.

A fresh catalyst ager, i.e. a dense phase fluidized bed 32", may be placed adjacent to the regenerator 13" so as to introduce the hot catalyst in the regenerator 13" into the heat exchanger 40" of the dense phase fluidized bed 32" via pipe line 42". A fresh catalytic cracking catalyst is fed into the dense phase fluidized bed 32" to heat exchange with the hot catalyst in the heat exchanger 40". The heat exchanged hot catalyst in the heat exchanger 40" is recycled back to the regenerator 13" via pipe line 41". Steam is fed into the bottom of the dense phase fluidized bed 32" via pipe line 31" for aging the heat exchanged fresh catalyst in the dense phase fluidized bed 32". The aged steam is recycled from the influx inlet a" to the disengager via pipe line 33" and used as dome steam or purge steam or linked with pipeline 11", injected into the stripper from influx inlets b" and c" and used as the stripping steam. According to the requirements on the commercial catalytic cracking unit, the aged catalyst is added into the regenerator 13" of the commercial catalytic cracking unit via pipeline 34". The main aire is fed into the regenerator 13" via pipe line 14" for regeneration of the catalyst. The flue gas is fed into the cyclone separator 36" for gas-solid separation. The separated flue gas departs from the regenerator via pipe line 15".

The following examples are used to demonstrate the effect of the present invention and are not meant to limit the scope of the invention to the detailed examples shown herein. The properties of the feedstock oil used in following examples and comparative examples are listed in Table 1.

Catalyst A zeolite used in Example 1 was the aged high silica zeolite. Said high silica zeolite was prepared by the following steps: using NaY to conduct $SiCl_4$ vapor phase treatment and rare earth ion exchange to obtain a sample having a silica:alumina ratio of 18 and a rare earth content of 2 wt % (calculated in terms of $RE_2O_3$), aging such sample at 800° C. and 100% steam. 969 g of halloysite (produced by China Kaolin Clay Company, and having a solid content of 73%) were slurried by using 4,300 g of decationic water. Then 781 g of pseudo-boehmite (produced by Shandong Zibo Boehmite Factory, and having a solid content of 64%) and 144 ml of hydrochloric acid (having a concentration of 30%, and a specific gravity of 1.56) were added therein, homogeneously stirred and stood for aging at 60° C. for 1 h. The pH thereof was maintained to be 2-4, and the temperature thereof decreased to room temperature. Then the pre-prepared zeolite slurry containing 800 g of high silica zeolites (dry basis) and 2,000 g of chemical water was added therein, homogeneously stirred, and dried by spraying to obtain the catalyst sample A after free $Na^+$ was washed off. The properties thereof are listed in Table 2.

Fresh catalytic cracking catalysts (commodity number is MLC-500) used in Examples 2 and 3 and comparative examples are produced by Qilu catalyst factory of SINOPEC Catalyst Company, the properties of which are listed in Table 2.

Example 1

Example 1 was conducted according to the procedures as shown in FIGS. 1 and 4. Fresh catalyst A (having a fresh catalyst activity of 81, a self-balancing time of 10 h under the conditions of 800° C. and 100% steam, and an equilibrium activity of 55) was aged under the conditions of 600° C., 100% steam, the superficial linear velocity of 0.25 m/s and the aging time of 20 h, and the resultant catalyst had an initial activity of 62. Said aged catalyst was supplemented into the regenerator. Vacuum residue feedstock oil A was used as the catalytic cracking feedstock to conduct the testin a pilot riser reactor plant. Inferior feedstock was fed into the bottom of the riser reactor and contacted with the aged catalyst A to carry out the catalytic cracking reaction. In the reaction zone I, the reaction temperature was 600° C.; the weight hourly space velocity was 100 $h^{-1}$; the weight ratio of the catalyst to the feedstock was 6; and the weight of steam to the feedstock was 0.05. In the reaction zone II, the reaction temperature was 500° C.; the weight hourly space velocity was 30 $h^{-1}$; and the weight of steam to the feedstock was 0.05. The operating conditions and product distribution were listed in Table 3.

Comparative Example 1

Comparative Example 1 was conducted according to the procedures as shown in FIG. 1. Fresh catalyst A (having a fresh catalyst activity of 81, a self-balancing time of 10 h at 800° C. and 100% steam and an equilibrium activity of 55) was directly supplemented into the regenerator without aging. The feedstock oil used therein was the same as that in Example 1, and the operating conditions and product distribution were listed in Table 3.

It can be seen from Table 3 that the dry gas and coke yields according to Example 1 were decreased respectively by 0.6% and 1.98% when compared with Comparative Example 1.

Example 2

Example 2 was conducted according to the procedures as shown in FIGS. 1 and 2. Fresh catalyst MLC-500 (having a fresh catalyst activity of 96, a self-balancing time of 60 h and an equilibrium activity of 45) was aged under the conditions of 650° C., 100% steam, the superficial linear velocity of 0.30 m/s and the aging time of 30 h, and the resultant catalyst had an initial activity of 68. Said aged catalyst was supplemented into the regenerator. Vacuum residue feedstock oil A was used as the catalytic cracking feedstock to conduct the test on the medium-sized apparatus of the riser reactor. Inferior feedstock was fed into the bottom of the riser reactor and contacted with the aged catalyst MLC-500 to carry out the catalytic cracking reaction. In the reaction zone I, the reaction temperature was 600° C.; the weight hourly space velocity was 100 h$^{-1}$ the weight ratio of the catalyst to the feedstock was 6; and the weight of steam to the feedstock was 0.05. In the reaction zone II, the reaction temperature was 500° C.; the weight hourly space velocity was 30 h$^{-1}$; and the weight of steam to the feedstock was 0.05. The operating conditions and product distribution were listed in Table 4.

Example 3

Example 3 was conducted according to the procedures as shown in FIGS. 1 and 3. Fresh catalyst MLC-500 (having a fresh catalyst activity of 96, a self-balancing time of 60 h and an equilibrium activity of 45) was aged under the conditions of 600° C., the steam/flue gas weight ratio of 1:1, the superficial linear velocity of 0.30 m/s and the aging time of 40 h, and the resultant catalyst had an initial activity of 65. Said aged catalyst was supplemented into the regenerator. Vacuum residue feedstock oil A was used as the catalytic cracking feedstock to conduct the test on the medium-sized apparatus of the riser reactor. Inferior feedstock was fed into the bottom of the riser reactor and contacted with the aged catalyst MLC-500 to carry out the catalytic cracking reaction. In the reaction zone I, the reaction temperature was 600° C.; the weight hourly space velocity was 100 h$^{-1}$; the weight ratio of the catalyst to the feedstock was 6; and the weight of steam to the feedstock was 0.05. In the reaction zone II, the reaction temperature was 500° C.; the weight hourly space velocity was 30 h$^{-1}$; and the weight of steam to the feedstock was 0.05. The operating conditions and product distribution were listed in Table 4.

Comparative Example 2

Comparative Example 2 was conducted according to the procedures as shown in FIG. 1. Fresh catalyst MLC-500 (having a fresh catalyst activity of 96, a self-balancing time of 60 h and an equilibrium activity of 45) was directly supplemented into the regenerator without aging. The feedstock oil used therein was the same as that in Examples 1-3, and the operating conditions and product distribution were listed in Table 4.

It can be seen from Table 4 that the dry gas and coke yields according to Example 2 were decreased respectively by 1.15% and 3.09% when compared with Comparative Example 2; the dry gas and coke yields according to Example 3 were decreased respectively by 1.25% and 3.29% when compared with Comparative Example 2.

TABLE 1

| Name of feedstock oil | Vacuum residue |
|---|---|
| Feedstock oil No. | A |
| Density (20° C.), g/cm$^3$ | 920.9 |
| Kinematic viscosity, mm$^2$/s | |
| 80° C. | / |
| 100° C. | 114.4 |
| Carbon residue, wt % | 8.2 |
| Freezing point, ° C. | 25 |
| Acid value, mgKOH/g | / |
| Total nitrogen content, wt % | 0.33 |
| Sulfur, wt % | 0.21 |
| C, wt % | 86.91 |
| H, wt % | 12.55 |
| Metal content, ppm | |
| Ni | 8.8 |
| V | 0.1 |
| Fe | 1.8 |
| Cu | <0.1 |
| Na | 3.0 |
| Ca | |
| Boiling range, ° C. | |
| IBP(Initial Boiling Point) | 415 |
| 10% | 545 |
| 30% | / |
| 50% | / |
| 70% | / |
| 90% | / |
| Final boiling point | / |

TABLE 2

| Catalyst No. | A | MLC-500 |
|---|---|---|
| Chemical composition, wt % | | |
| Aluminum oxide | 25 | 50.2 |
| Sodium oxide | | 0.321 |
| Rare earth | | |
| Apparent density, kg/m$^3$ | 790 | 700 |
| Pore volume, mL/g | | 0.38 |
| Specific surface area, m$^2$/g | 156 | 229 |
| Attrition index, wt % · h$^{-1}$ | 1.0 | 1.9 |
| Sieve composition, wt % | | |
| 0-40 μm | 12.0 | 17.3 |
| 40-80 μm | 65.0 | 49.3 |
| >80 μm | 23 | 33.4 |
| Fresh catalyst activity | 81 | 96 |
| Self-balancing time, h | 10 | 60 |
| Equilibrium activity | 55 | 45 |

TABLE 3

| Catalyst No. | Example 1<br>A | Comp. Exp. 1<br>A |
|---|---|---|
| Aging conditions | | |
| Aging temperature, °C. | 600 | — |
| Superficial linear velocity of the fluidized bed, m/s | 0.25 | — |
| Aging time, h | 20 | — |
| Weight ratio of steam to aging medium | 100% steam | — |
| Initial activity of the catalyst when added into the commercial catalytic cracking unit | 62 | 81 |
| Feedstock oil No. | A | A |
| Operating conditions in Reaction zone I | | |
| Reaction temperature, °C. | 600 | 600 |
| Weight hourly space velocity (WHSV), $h^{-1}$ | 100 | 100 |
| Steam/feedstock oil weight ratio, m/m | 0.05 | 0.05 |
| Catalyst/feedstock ratio, m/m | 6 | 6 |
| Operating conditions in Reaction zone II | | |
| Reaction temperature, °C. | 500 | 500 |
| Weight hourly space velocity (WHSV), $h^{-1}$ | 30 | 30 |
| Steam/feedstock oil weight ratio, m/m | 0.05 | 0.05 |
| Product distribution, wt % | | |
| Dry gas | 2.25 | 2.85 |
| LPG | 16.04 | 17.34 |
| Gasoline | 40.03 | 40.55 |
| Diesel oil | 20.89 | 19.01 |
| Fluid catalytic cracking gas oil (FGO) | 13.56 | 11.04 |
| Coke | 7.23 | 9.21 |
| Total | 100.00 | 100.00 |

TABLE 4

| Catalyst No. | Example 2<br>MLC-500 | Example 3<br>MLC-500 | Comp. Exp. 2<br>MLC-500 |
|---|---|---|---|
| Aging conditions | | | |
| Aging temperature, °C. | 650 | 600 | — |
| Superficial linear velocity of the fluidized bed, m/s | 0.30 | 0.30 | — |
| Aging time, h | 30 | 40 | — |
| Weight ratio of steam to aging medium | 100% steam | 1:1 (steam:flue gas) | — |
| Initial activity of the catalyst when added into the commercial catalytic cracking unit | 68 | 65 | 96 |
| Feedstock oil No. | A | A | A |
| Operating conditions in Reaction zone I | | | |
| Reaction temperature, °C. | 600 | 600 | 600 |
| Weight hourly space velocity (WHSV), $h^{-1}$ | 100 | 100 | 100 |
| Steam/feedstock oil weight ratio, m/m | 0.05 | 0.05 | 0.05 |
| Catalyst/feedstock ratio, m/m | 6 | 6 | 6 |
| Operating conditions in Reaction zone II | | | |
| Reaction temperature, °C. | 500 | 500 | 500 |
| Weight hourly space velocity (WHSV), $h^{-1}$ | 30 | 30 | 30 |
| Steam/feedstock oil weight ratio, m/m | 0.05 | 0.05 | 0.05 |
| Product distribution, wt % | | | |
| Dry gas | 2.45 | 2.35 | 3.60 |
| LPG | 15.46 | 15.40 | 16.22 |
| Gasoline | 38.31 | 38.05 | 37.62 |
| Diesel oil | 23.32 | 23.67 | 21.23 |
| Fluid catalytic cracking gas oil (FGO) | 12.34 | 12.61 | 10.12 |
| Coke | 8.12 | 7.92 | 11.21 |
| Total | 100.00 | 100.00 | 100.00 |

It is appreciated that certain aspects and characteristics of the invention, which are, for clarity, described in the context of separate embodiments, may also be provided in combination in a single embodiment. Conversely, various aspects and characteristics of the invention, which are, for brevity, described in the context of a single embodiment, may also be provided separately or in any suitable sub-combination.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A catalytic cracking catalyst as introduced into a fluid catalytic cracking (FCC) reaction system, comprising:
   relative to a total weight of the catalyst, 1-50% by weight of a zeolite, 5-99% by weight of an inorganic oxide and 0-70% by weight of an optional clay, wherein the zeolite is a medium pore zeolite or a large pore zeolite,
   wherein the catalytic cracking catalyst is obtained by aging a fresh catalytic cracking catalyst in an aging medium,
   wherein the fresh catalytic cracking catalyst prior to aging has a fresh catalyst activity ranging from 81 to 96,
   wherein the catalytic cracking catalyst after aging has an initial activity of higher than 80, a self-balancing time of 0.1-50 h, and an equilibrium activity of 35-60 as introduced into the FCC reaction system at one or more locations chosen from a regenerator, a disengager, a riser, or a steam stripper,
   wherein the aging medium is a mixture of steam and a flue gas from the FCC reaction system, and
   wherein the fresh catalyst activity prior to aging, the initial activity of the catalytic cracking catalyst after aging, and the equilibrium activity of the catalyst cracking catalyst are measured according to RIPP 92-90.

2. The catalytic cracking catalyst according to claim 1, wherein the medium pore zeolite is selected from the group consisting of ZSM series of zeolites and ZRP zeolite, and the large pore zeolite is selected from the group consisting of rare earth Y zeolite (REY), rare earth hydrogen Y zeolite (REHY), ultra-stable Y zeolite, and high-silica Y zeolite.

3. The catalytic cracking catalyst according to claim 1, having a self-balancing time of 0.5-10 h.

4. The catalytic cracking catalyst according to claim 1, wherein the medium pore zeolites are modified with phosphor and/or transitional metal elements chosen from iron, cobalt, or nickel.

5. A method for improving the selectivity of a catalytic cracking process, characterized in that the method comprises the steps of:
   (1) aging a fresh catalytic cracking catalyst in a fluidized bed by contacting the fresh catalytic cracking catalyst with a mixture comprising steam and a flue gas from a FCC reaction system under a certain hydrothermal circumstance to obtain the catalytic cracking catalyst of claim 1; and
   (2) feeding the catalytic cracking catalyst of claim 1 into a catalytic cracking unit.

6. The method according to claim 5, characterized in that the aged catalyst is fed into the regenerator of the catalytic cracking unit.

7. The method according to claim 5, characterized in that the fluidized bed is a dense phase fluidized bed.

8. The method according to claim 5, characterized in that the fresh catalyst comprises, relative to the total weight of the catalyst, 1-50% by weight of a zeolite, 5-99% by weight of an inorganic oxide and 0-70% by weight of an optional clay, wherein the zeolite is selected from medium pore zeolites and/or large pore zeolites.

9. The method according to claim 5, characterized in that the hydrothermal circumstance condition comprises an aging temperature of 400-850° C., a superficial linear velocity of the fluidized bed of 0.1-0.6 m/s, and an aging time of 1-720 h.

10. The method according to claim 9, characterized in that the hydrothermal circumstance comprises an aging temperature of 500-700° C., a superficial linear velocity of the fluidized bed of 0.15-0.5 m/s, and an aging time of 5-360 h.

11. The method according to claim 5, characterized in that steam after the aging step is used is one or more selected from the group consisting of stripping steam, dome steam, atomizing steam and lifting steam, and respectively added into the stripper, disengager, feedstock nozzle and prelifting zone of the catalytic cracking unit.

12. A method for improving the selectivity of a catalytic cracking process, characterized in that the method comprises the steps of:
   (1) feeding a fresh catalytic cracking catalyst into a fluidized bed, contacting the fresh catalytic cracking catalyst with an aging medium comprising steam and a flue gas from a FCC reaction system, aging under a certain hydrothermal circumstance to obtain the catalytic cracking catalyst of claim 1; and
   (2) feeding the catalytic cracking catalyst into a catalytic cracking unit.

13. The method according to claim 12, characterized in that the hydrothermal circumstance comprises a steam:aging medium ratio of 0.2:0.9 by weight.

14. The method according to claim 13, characterized in that the hydrothermal circumstance comprises a steam:aging medium ratio of 0.4:0.6 by weight.

15. The method according to claim 12, characterized in that the hydrothermal circumstance comprises an aging temperature of 400-850° C., a superficial linear velocity of the fluidized bed of 0.1-0.6 m/s, and an aging time of 1-720 h.

16. The method according to claim 15, characterized in that the hydrothermal circumstance comprises an aging temperature of 500-750° C., a superficial linear velocity of the fluidized bed of 0.15-0.5 m/s, and an aging time of 5-360 h.

17. The method according to claim 12, characterized in that the aging medium is fed into a regenerator after the aging step.

18. A processing method for improving the selectivity of a catalytic cracking process, characterized in that the method comprises the steps of:
   (1) feeding a fresh catalytic cracking catalyst into a fluidized bed, introducing a hot regenerated catalyst in a regenerator into the fluidized bed, and heat exchanging the fresh catalyst and the hot regenerated catalyst in the fluidized bed;

(2) contacting the heat exchanged fresh catalytic cracking catalyst with steam or an aging medium comprising steam and a flue gas from a FCC reaction system, aging under a certain hydrothermal circumstance to obtain the catalytic cracking catalyst of claim 1; and (3) feeding the catalytic cracking catalyst of claim 1 into a catalytic cracking unit.

19. The method according to claim 18, characterized in that the hydrothermal circumstance comprises a steam:aging medium ratio of greater than 0-4 by weight.

20. The method according to claim 19, characterized in that the hydrothermal circumstance comprises a steam:aging medium ratio of 0.5:1.5 by weight.

21. The method according to claim 18, characterized in that the hydrothermal circumstance comprises an aging temperature of 400-850° C., a superficial linear velocity of the fluidized bed of 0.1-0.6 m/s, and an aging time of 1-720 h.

22. The method according to claim 21, characterized in that the hydrothermal circumstance comprises an aging temperature of 500-750° C., a superficial linear velocity of the fluidized bed of 0.15-0.5 m/s, and an aging time of 5-360 h.

23. The method according to claim 18, characterized in that the method further comprises the steps of (4) feeding steam into a reaction system or a regeneration system, or feeding the aging medium containing steam into a regeneration system; and (5) recycling the heat exchanged regenerated catalyst back to the regenerator.

24. A catalytic cracking process comprising contacting a feedstock oil with the catalytic cracking catalyst of claim 1 under conditions effective to generate cracked petroleum product.

25. A catalytic cracking catalyst for fluid catalytic cracking, comprising: relative to the total weight of the catalyst, 1-50% by weight of a zeolite, 5-99% by weight of an inorganic oxide and 0-70% by weight of an optional clay, wherein the zeolite is a medium pore zeolite or a large pore zeolite, wherein the catalytic cracking catalyst has an initial activity after an aging process not higher than 80, a self-balancing time of 0.1-50 h, and an equilibrium activity of 35-60, wherein the aging process comprises:

feeding a fresh catalytic cracking catalyst into a fluidized bed, contacting the fresh catalyst with an aging medium comprising steam and a flue gas from a fluid catalytic cracking catalyst regenerator, aging under a certain hydrothermal circumstance to obtain the catalytic cracking catalyst, and wherein the fresh catalytic cracking catalyst has a fresh catalyst activity prior to the aging process ranging from 81-96.

26. The catalytic cracking catalyst of claim 25, wherein the medium pore zeolite is selected from the group consisting of ZSM series of zeolites and ZRP zeolite, and the large pore zeolite is selected from the group consisting of rare earth Y zeolite (REY), rare earth hydrogen Y zeolite (REHY), ultra-stable Y zeolite, and high-silica Y zeolite.

* * * * *